(12) United States Patent
Gabrielle et al.

(10) Patent No.: US 11,808,640 B2
(45) Date of Patent: Nov. 7, 2023

(54) TEMPERATURE SENSOR FOR A FLUID CIRCUIT OF MOTOR VEHICLE

(71) Applicant: Hutchinson, Paris (FR)

(72) Inventors: Brice Gabrielle, Montargis (FR); Thierry Benard, Checy (FR)

(73) Assignee: HUTCHINSON, Paris (FR)

( * ) Notice: Subject to any disclaimer, the term of this patent is extended or adjusted under 35 U.S.C. 154(b) by 127 days.

(21) Appl. No.: 17/471,669

(22) Filed: Sep. 10, 2021

(65) Prior Publication Data

US 2022/0082455 A1    Mar. 17, 2022

(30) Foreign Application Priority Data

Sep. 11, 2020  (FR) ...................................... 2009190

(51) Int. Cl.
| | | |
|---|---|---|
| *G01K 13/02* | (2021.01) | |
| *B29C 45/14* | (2006.01) | |
| *G01L 19/00* | (2006.01) | |
| *G01K 1/14* | (2021.01) | |

(52) U.S. Cl.
CPC ........ *G01K 13/02* (2013.01); *B29C 45/14467* (2013.01); *G01K 1/14* (2013.01); *G01L 19/0092* (2013.01); *G01K 2205/00* (2013.01)

(58) Field of Classification Search
CPC ....... G01K 13/02; G01K 1/14; G01K 2205/00
USPC ................................................ 374/148, 208
See application file for complete search history.

(56) References Cited

U.S. PATENT DOCUMENTS

| 4,418,329 A | 11/1983 | Gruner |
| 9,939,340 B2 | 4/2018 | Novellani |

FOREIGN PATENT DOCUMENTS

| DE | 3812195 A1 | * | 11/1988 | |
| DE | 102015113238 A1 | * | 2/2017 | |
| DE | 102019131342 A1 | * | 5/2021 | ............. G01K 13/02 |
| EP | 0909950 A2 | * | 4/1999 | |
| FR | 2808327 A1 | | 11/2001 | |
| KR | 101151210 B1 | * | 5/2012 | |
| KR | 20170049733 A | * | 5/2017 | |
| WO | 2010142307 A1 | | 12/2010 | |

* cited by examiner

*Primary Examiner* — Mirellys Jagan
(74) *Attorney, Agent, or Firm* — BROWDY AND NEIMARK, P.L.L.C.

(57) ABSTRACT

The invention relates to a temperature sensor (10) for a fluid pipe, in particular for a motor vehicle, this sensor (10) comprising a first part (20) comprising a flat surface (22) configured to be in contact with a fluid and on which is located a track (41) forming a thermosensitive element (40), this track (41) having a generally elongated shape and comprising opposite ends (41A, 41B) connected respectively to terminals (43) of the sensor (10) by electrical conductors (42) embedded in said body (15).

The invention also relates to a fluid pipe comprising such a sensor (10), a motor vehicle comprising such a sensor (10) or such a pipe and a method for manufacturing such a sensor (10).

15 Claims, 6 Drawing Sheets

[Fig.1]
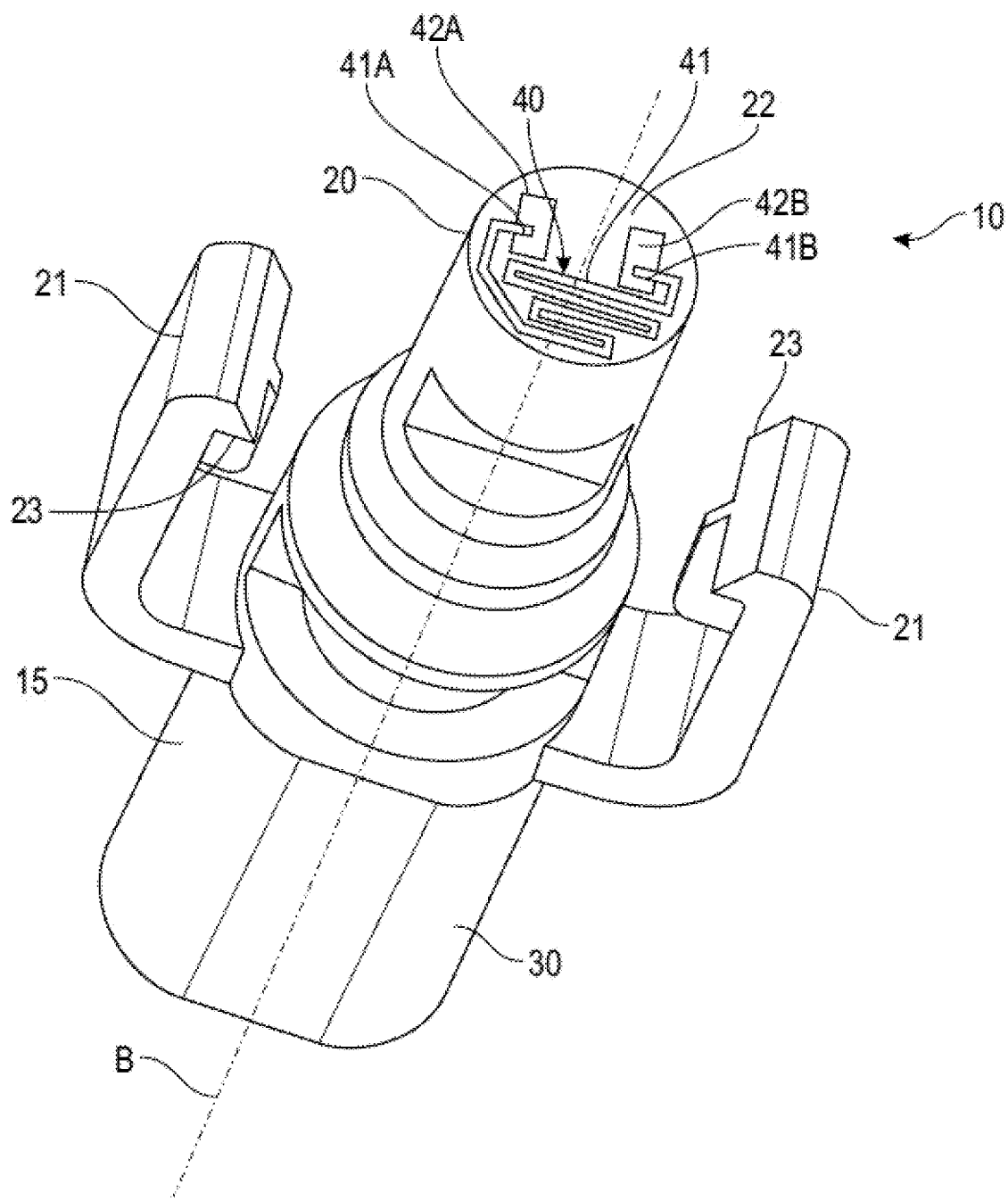

[Fig.2]
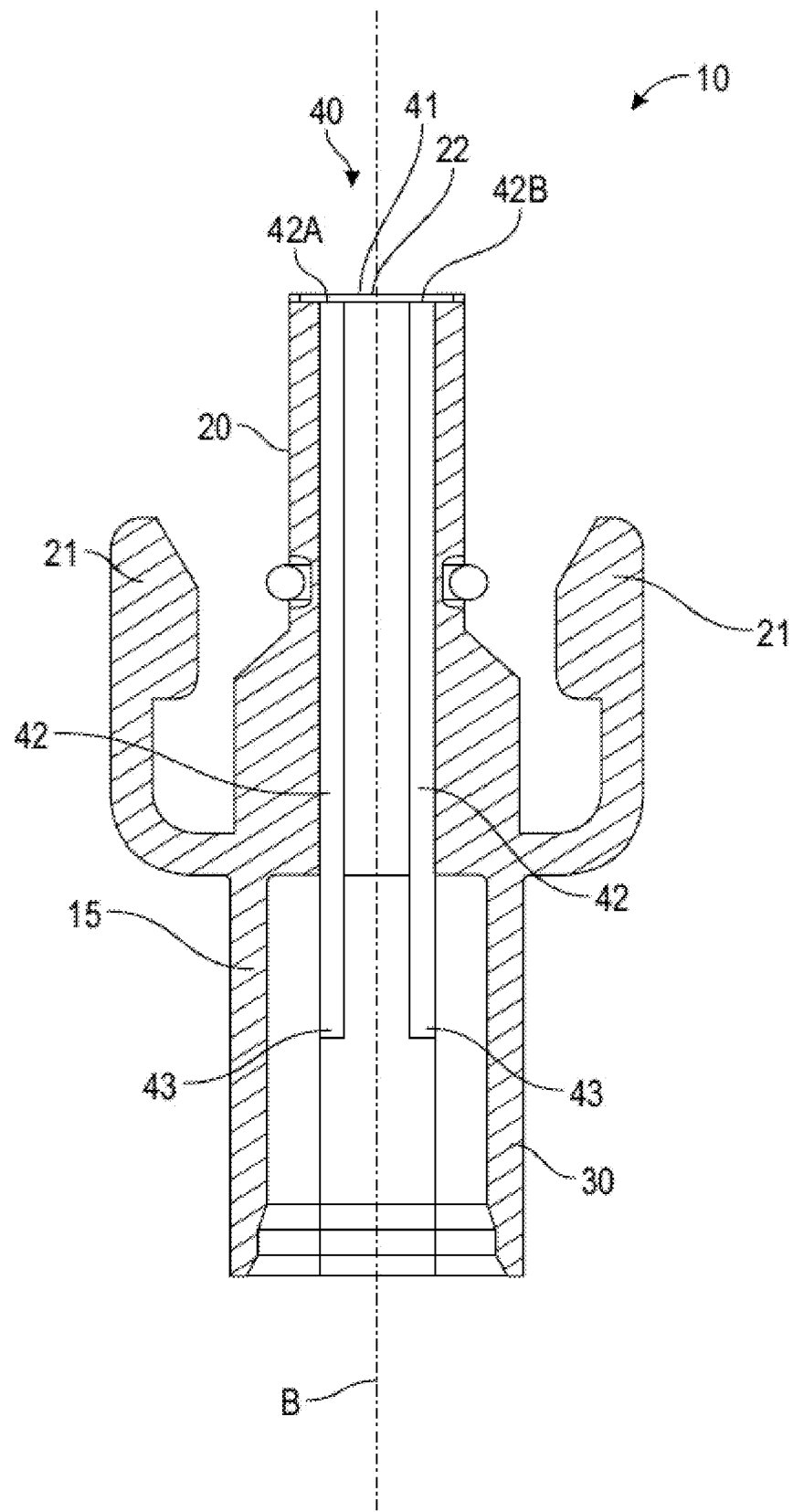

[Fig.3]
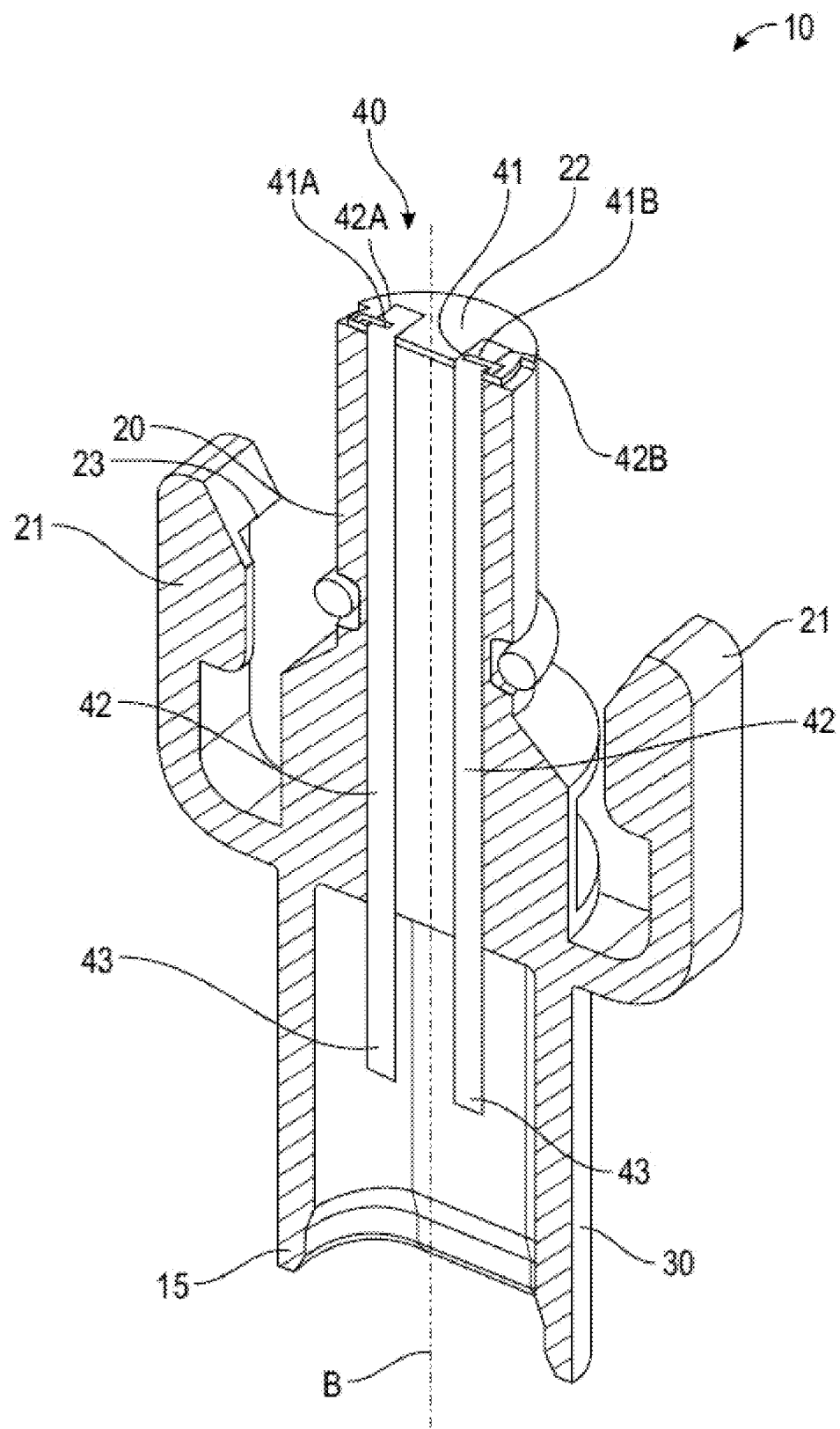

[Fig.4]
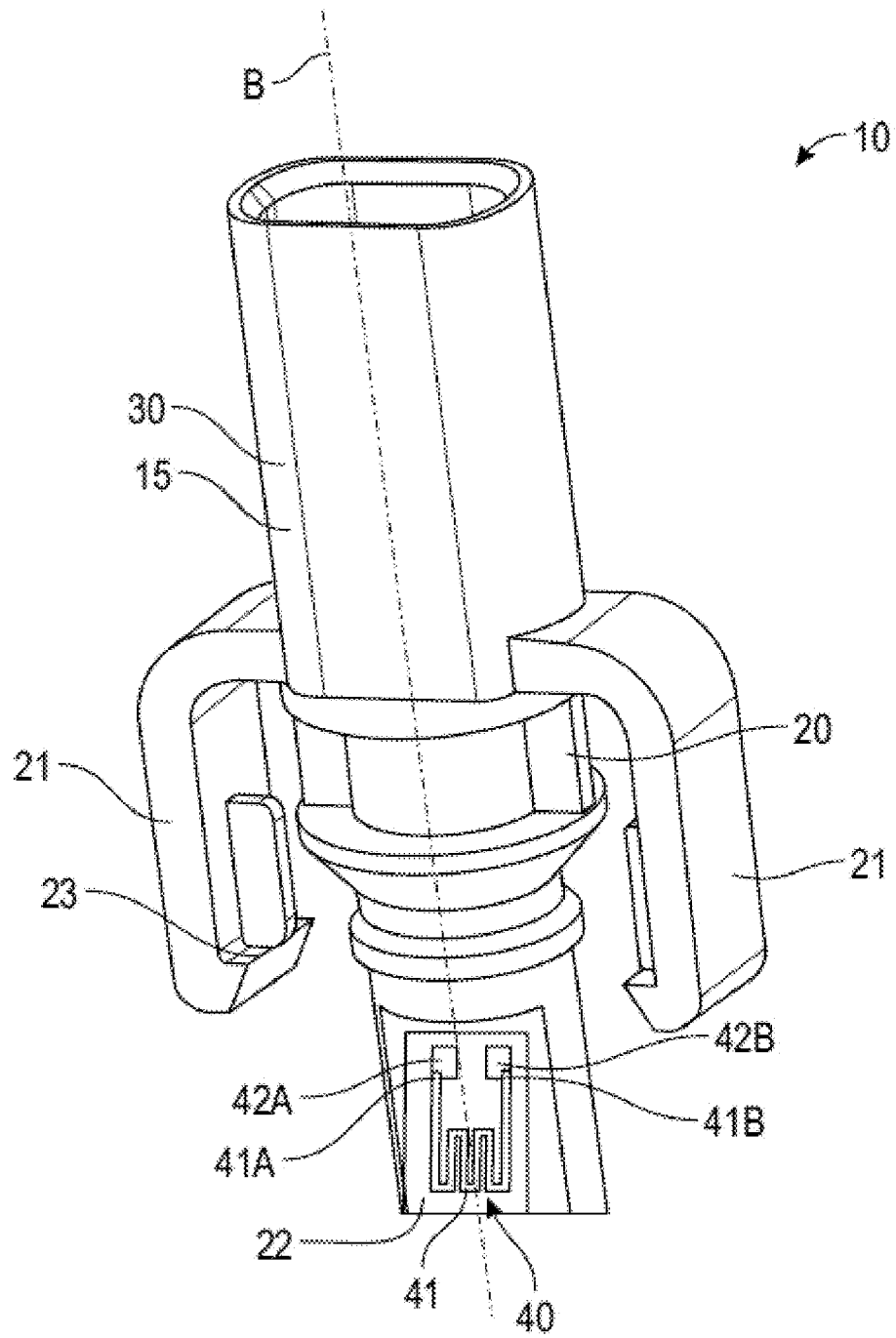

[Fig.5]
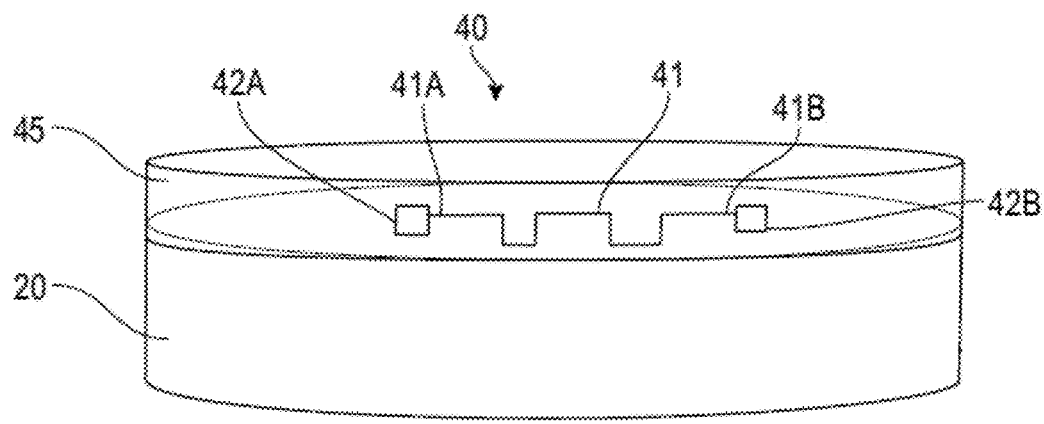
[Fig.6]
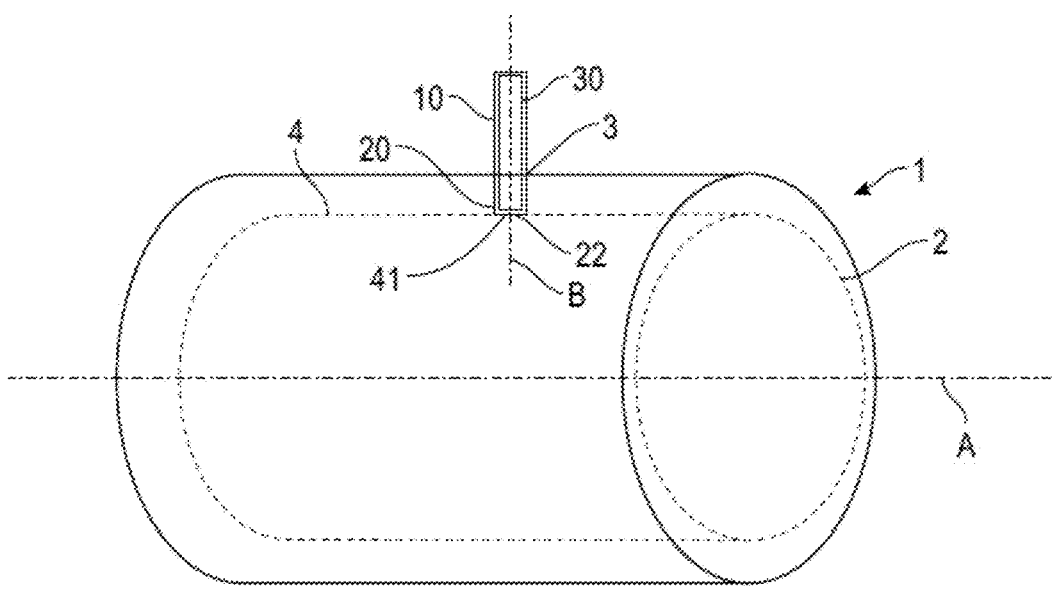

[Fig.7]
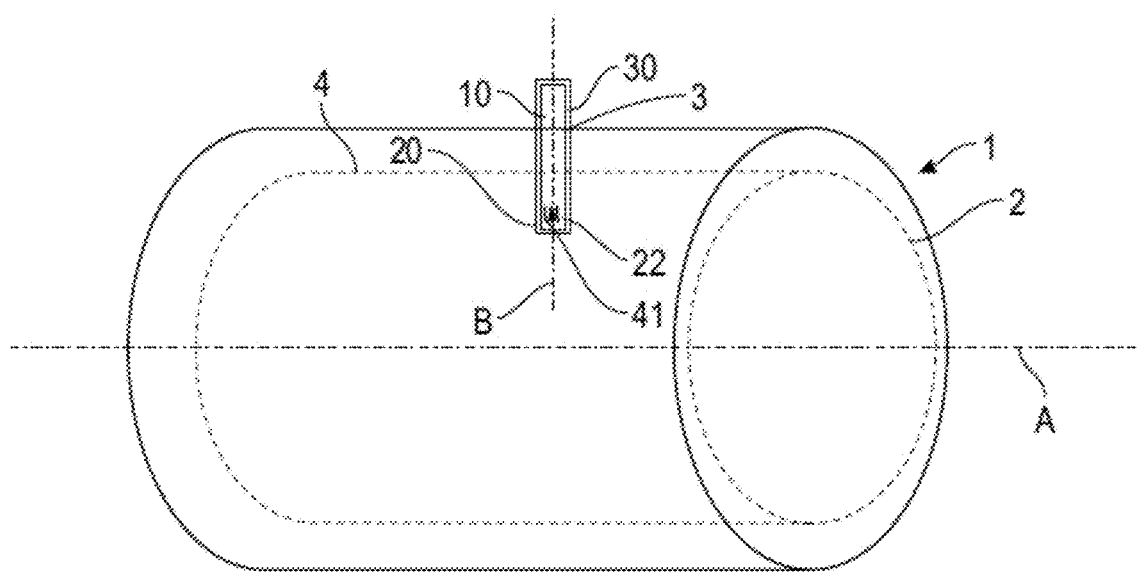

TEMPERATURE SENSOR FOR A FLUID CIRCUIT OF MOTOR VEHICLE

TECHNICAL FIELD OF THE INVENTION

The present invention relates in particular to a temperature sensor for a fluid circuit, in particular of a motor vehicle.

BACKGROUND

A vehicle, in particular a motor vehicle, comprises several fluid circuits whose temperature must be measured and controlled in order to check in real time the correct operation of the vehicle. This is the case, for example, with a cooling or air intake system in a motor vehicle.

There are several technologies for temperature sensors. In particular, known from the document FR-A1-2 808 327 is a temperature sensor comprising a sensitive element designed to measure a temperature. The temperature sensor is configured to be fixed to the wall of an air intake pipe of an internal combustion engine so that its sensitive element is in contact with the fluid flow whose temperature is to be measured.

The sensitive element is positioned in a cavity bounded by a window defined in the middle of a cage extending into the air intake conduit so that the fluid flow passes through the cage by the window, comes into contact with the sensitive element before exiting the cavity. The contact between the air flow and the sensitive element allows this latter to measure the temperature of the flow.

However, the cage, and in particular its cavity, will cause a disturbance in the flowing of the flow and thus disturb the proper functioning of the air intake pipe. Also known from the document U.S. Pat. No. 4,418,329 is a temperature sensor which comprises several pieces made of different materials and is therefore relatively complex and expensive to manufacture. The reliability of this type of sensor is not always optimal because the sensitive element is housed in a part that can foul and is connected to terminals by fragile means such as soldering.

In particular, the present invention is intended to solve some or all of the above problems.

SUMMARY OF THE INVENTION

The present invention relates to a temperature sensor for a fluid pipe, in particular for a motor vehicle, this sensor comprising a body made of plastic or composite material comprising a first part configured to be engaged in said pipe and to be in contact with said fluid, and a second part configured to be located outside the pipe, the body further comprising at least one fixing bracket configured to cooperate with the pipe and to ensure the fixing of the sensor on this pipe, the sensor further comprising at least one thermosensitive element located on the first part of the body and connected to electrical connection terminals located on the second part of the body, characterized in that the first part of the body comprises a flat surface configured to be in contact with the fluid and on which is located a track forming said thermosensitive element, this track having a generally elongated shape and comprising opposite ends connected respectively to said terminals by electrical conductors embedded in said body.

Thus, by being positioned on a flat surface, the track forming the thermosensitive element will have little or no effect on the flow of the fluid whose temperature is to be measured. The sensor is also simple to manufacture and allows to optimize the transmission time of the signals from the track to the terminals. This transmission time, which is equivalent to the response time of the sensor, can be less than 1 s and for example of the order of 0.5 s.

Advantageously, the first and second parts are made in one piece and the flat surface is located at a free end of the first part of the body, which is located outside the body for being in contact with the fluid.

We understand thus that the sensor relatively easy and economical to manufacture. It is also understood that the risk of fouling of the sensor is low as it is located outside the body and therefore adapted to be swept by the fluid during operation.

In addition, the electrical conductors embedded in the body extend continuously from the free end of the body where the sensitive element is located, to the terminals, thereby increasing the reliability of the sensor.

The temperature sensor according to the invention may comprise one or more of the following characteristics, taken alone or in combination with each other:
- the track forms a serpentine;
- the track has a thickness of less than or equal to 20 μm, and/or a length of greater than or equal to 1000 μm, and/or a width of less than or equal to 1000 μm;
- the surface is substantially circular or rectangular;
- the surface has a surface area greater than or equal to 0.5 $cm^2$;
- the conductors have ends which are flush with said surface and which are covered by said ends of the track;
- the track is formed by a printed or transferred ink;
- the track and the surface are covered by a passivation layer; and
- the fixing bracket is configured to be fixed to the pipe by elastic snap-fit, screwing, or crimping.

The invention also relates to a fluid pipe, in particular for a motor vehicle, comprising a fluid circulation hose and a sensor as described above, the sensor having its first part passing through an orifice of the hose so that said surface is in contact with the fluid circulating in the hose.

The pipe according to the invention may comprise one or more of the following characteristics, taken alone or in combination with each other:
- the surface extends tangentially with respect to a circumference centred on a longitudinal axis of the hose;
- the surface extends in axial extension of an inner cylindrical surface of the hose; and
- the surface extends parallel to a longitudinal axis of the hose.

The invention also relates to a vehicle, in particular motor vehicle, comprising at least one sensor as defined above or at least one pipe as defined above. The invention further relates to a method for manufacturing a sensor as defined above.

According to the invention, the method comprises the steps of:
a) positioning electrical conductors in a mold,
b) injecting a plastic or composite material into the mold so that the first and second parts of the body are made in one piece and the conductors are embedded in this material, the conductors extending continuously from electrical connection terminals to a flat surface of the body which is located outside and at a free end of the body,
c) applying a thermosensitive track on the surface and in contact with the conductors.

The method according to the invention may comprise one or more of the following characteristics, taken alone or in combination with each other:
- the track is deposited in the step c) by printing or by transferring an ink.
- the method comprises a subsequent step d) of covering the track and the surface with a passivation layer.

BRIEF DESCRIPTION OF FIGURES

Further characteristics and advantages of the invention will become apparent from the following detailed description, for the understanding of which reference is made to the attached drawings in which:

FIG. 1 is a schematic perspective view of the sensor according to the invention;

FIG. 2 is a schematic view of the sensor in FIG. 1 in longitudinal section;

FIG. 3 is a schematic cross-sectional and perspective view of the sensor according to the invention;

FIG. 4 is a schematic perspective view of an embodiment of the sensor according to the invention;

FIG. 5 is a schematic perspective view of a passivation layer located on the sensor of the invention;

FIG. 6 is a schematic view of a fluid pipe on which the sensor according to the invention is located;

FIG. 7 is a schematic view of a fluid pipe on which the sensor of FIG. 4 is located.

DETAILED DESCRIPTION OF THE INVENTION

Reference is first made to FIGS. 1 to 3, which show a temperature sensor 10 according to the invention in a very schematic manner.

The sensor 10 is intended to equip a fluid circuit or pipe (reference 1 in FIGS. 6 and 7), in particular of a motor vehicle, and for example a cooling circuit. The sensor 10 comprises a body 15 made of plastic or composite material extending longitudinally along a longitudinal axis B.

The body 15 comprises a first part 20 configured to be engaged in the pipe and to contact the fluid. This first part 20 extends longitudinally along the longitudinal axis B and takes the form of a finger.

The body 15 also comprises a second part 30 configured to be located outside the pipe. This second part 30 extends longitudinally along the longitudinal axis B in a manner opposite to the first part 20.

The body 15 also comprises at least one fixing bracket 21, in this case two fixing brackets 21, configured to cooperate with the pipe and to ensure the fixing of the sensor 10 to this pipe.

The fixing brackets 21 are here configured to be fixed to the pipe by elastic snap-fit but could also be configured to be fixed to the pipe by screwing, or crimping.

To this end, the brackets 21 comprise teeth 23 configured to hook onto the pipe by elastic snap-fit.

The advantage of the elastic snap-fit is that the sensor 10 is well positioned in relation to the fluid flow.

The sensor 10 also comprises at least one thermosensitive element 40 located on the first part 20 of the body 15 and connected to electrical connection terminals 43 located on the second part 30 of the body 15.

The first part 20 of the body 15 comprises a flat surface 22 configured to be in contact with the fluid and on which is located a track 41 forming the thermosensitive element 40.

Thus, the flat shape of the surface 22 has little effect on the flow of the fluid.

The surface 22 is for example substantially circular or rectangular.

The surface 22 has a surface area greater than or equal to 0.5 cm$^2$.

In the alternative embodiment illustrated in FIGS. 1 to 3, the surface 22 is perpendicular to the longitudinal axis B. In contrast, in the alternative embodiment of the invention illustrated in FIG. 4, the surface 22 is parallel to the longitudinal axis B.

The track 41 is generally elongated and comprises opposite ends 41A, 41B connected respectively to the terminals 43 by electrical conductors 42 embedded in the body 15. The track can thus transmit an electrical signal representative of the temperature to the terminals 43 by means of the conductors 42. An exploitation apparatus (not shown) will then be able to retrieve and exploit the information.

The track 41 forms for example a serpentine.

In particular, the track 41 has a thickness less than or equal to 20 µm, and/or a length greater than or equal to 1000 µm, and/or a width less than or equal to 1000 µm.

The conductors 42 have ends 42A, 42B that are flush with the surface 22 and are covered by the ends 41A, 41B of the track 41.

The track 41 is formed by a printed or transferred ink.

As seen in FIG. 5, the track 41 and the surface 22 are covered by a passivation layer 45.

The function of the passivation layer is to protect the track 41 from the aggression of the external environment. External environmental aggressions include: chemical aggression (humidity, temperature, aggressive fluids) which could chemically damage the ink and mechanical aggression (impact, abrasion) which could mechanically damage the ink.

In order to improve the aerodynamics, it is possible to round off the corners and the surfaces of all the elements of the sensor that are intended to be in contact with the fluid.

As can be seen in FIGS. 6 and 7, the fluid pipe 1 comprises a fluid circulation hose 2 and a sensor 10 as described above.

The sensor 10 has its first part 20 passing through an orifice 3 of the hose 2 so that the surface 22 is in contact with the fluid circulating through the hose 2.

As shown in FIG. 6, the surface 22 extends tangentially with respect to a circumference centered on a longitudinal axis A of the hose 2. This is the alternative embodiment of the sensor 10 shown in FIGS. 1 to 3. The surface 22 here extends in axial extension of an inner cylindrical surface 4 of the hose 2. The surface 22 is therefore flush with the fluid and does not disturb its flow. According to an alternative embodiment of the invention visible in FIG. 7, the surface 22 may extend in a plane parallel to the longitudinal axis A of the hose 2. This is the alternative embodiment of the sensor 10 shown in FIG. 4. The surface 22 extends parallel to the flow of the fluid and has very little effect on it.

The two illustrated variants of the invention thus allow to limit as much as possible the disturbance of the fluid circulating inside the pipe 1.

The invention also relates to a vehicle, in particular a motor vehicle, comprising at least one sensor 10 as described above or at least one pipe 1 as described above.

The invention further relates to a method for manufacturing a sensor 10 as described above.

The method comprises the following steps:
a) positioning the electrical conductors 42 in a mold,
b) injecting a plastic or composite material into the mold so that the body 15 is manufactured and the conductors 42 are embedded in this material, the conductors 42 extending to the flat surface 22 of the body 15, c) deposing a thermosensitive track 41 on the surface 22 and in contact with the conductors 42.

The conductors 22 are thus positioned in the mold before the plastic material is injected, which allows in particular to have a simple internal structure and facilitates the steps of manufacturing the sensor 10.

The track 41 is, for example, deposited in the step c) by printing or by transferring an ink.

For example, the transfer can be done by means of a transfer foil, which can also act as a passivation layer.

In particular, the method comprises a subsequent step d) of covering the track 41 and the surface 22 with the passivation layer 45.

The invention claimed is:

1. A temperature sensor for a fluid pipe, this temperature sensor comprising:
    a body made of plastic or composite material comprising:
        a first part configured to be engaged in said pipe and to be in contact with said fluid,
        a second part configured to be located outside the pipe, and
        at least one fixing bracket configured to cooperate with the pipe and to ensure the fixing of the sensor on this pipe; and
    at least one thermosensitive element located on the first part of the body and connected to electrical connection terminals located on the second part of the body;
    wherein the first and second parts are made in one piece and the first part of the body comprises at a free end a flat surface which is located outside the body so as to be in contact with the fluid and on which is located a track forming said thermosensitive element, this track having a generally elongated shape and comprising opposite ends connected respectively to said terminals by electrical conductors embedded in said body and extending continuously from said free end to the terminals.

2. The temperature sensor according to claim 1, wherein the track forms a serpentine.

3. The temperature sensor according to claim 1, wherein the track has a thickness of less than or equal to 20 μm, and/or a length of greater than or equal to 1000 μm, and/or a width of less than or equal to 1000 μm.

4. The temperature sensor according to claim 1, wherein the surface is substantially circular or rectangular.

5. The temperature sensor according to claim 1, wherein the surface has a surface area greater than or equal to 0.5 cm$^2$.

6. The temperature sensor according to claim 1, wherein the conductors have ends which are flush with said surface and which are covered by said ends of the track.

7. The temperature sensor according to claim 1, wherein the track is formed by a printed or transferred ink.

8. The temperature sensor according to claim 1, wherein the track and the surface are covered by a passivation layer.

9. The temperature sensor according to claim 1, wherein the fixing bracket is configured to be fixed to the pipe by elastic snap-fit, screwing, or crimping.

10. A fluid pipe comprising a fluid circulation hose and a temperature sensor according to claim 1, the temperature sensor having its first part passing through an orifice of the fluid circulation hose so that said surface is in contact with the fluid circulating in the fluid circulation hose.

11. The fluid pipe according to claim 10, wherein the surface extends in axial extension of an inner cylindrical surface of the fluid circulation hose.

12. A vehicle comprising at least one temperature sensor according to claim 1 or at least one pipe according to claim 10.

13. A method for manufacturing a temperature sensor according to claim 1, wherein the method comprises the steps of:
    a) positioning electrical conductors in a mold,
    b) injecting a plastic or composite material into the mold so that the first and second parts of the body are made in one piece and the conductors are embedded in this material, the conductors extending continuously from electrical connection terminals to a flat surface of the body which is located outside and at a free end of the body,
    c) applying a thermosensitive track on the surface and in contact with the conductors.

14. The method according to claim 13, wherein the track is deposited in the step c) by printing or by transferring an ink.

15. The method according to claim 13, wherein it comprises a subsequent step d) of covering the track and the surface with a passivation layer.

* * * * *